(12) United States Patent
Cui et al.

(10) Patent No.: US 12,139,867 B1
(45) Date of Patent: Nov. 12, 2024

(54) ECOLOGICAL RESTORATION METHOD FOR WADING BIRD HABITAT IN COASTAL MUDFLAT WETLAND

(71) Applicant: Institute of Ecological Protection and Restoration, Chinese Academy of Forestry Science, Beijing (CN)

(72) Inventors: Lijuan Cui, Beijing (CN); Gang Liu, Beijing (CN); Wei Li, Beijing (CN); Manyin Zhang, Beijing (CN)

( * ) Notice: Subject to any disclaimer, the term of this patent is extended or adjusted under 35 U.S.C. 154(b) by 0 days.

(21) Appl. No.: 18/415,539

(22) Filed: Jan. 17, 2024

(30) Foreign Application Priority Data

Nov. 27, 2023 (CN) .......................... 202311586342.1

(51) Int. Cl.
*E02B 3/10* (2006.01)
*A01C 21/00* (2006.01)
*A01K 39/00* (2006.01)

(52) U.S. Cl.
CPC ................ *E02B 3/10* (2013.01); *A01C 21/00* (2013.01); *A01K 39/00* (2013.01)

(58) Field of Classification Search
CPC ............ E02B 3/10; A01C 21/00; A01K 39/00
See application file for complete search history.

(56) References Cited

U.S. PATENT DOCUMENTS

2022/0174916 A1\* 6/2022 Wang ..................... A01K 61/10

FOREIGN PATENT DOCUMENTS

| CN | 101161944 A | 4/2008 |
| CN | 115146947 A | 10/2022 |

\* cited by examiner

*Primary Examiner* — Janine M Kreck
(74) *Attorney, Agent, or Firm* — Harness, Dickey & Pierce, P.L.C.; Anthony G. Fussner

(57) ABSTRACT

An ecological restoration method for wading bird habitat in coastal mudflat wetland comprises:

S1. performing micro terrain renovation on a candidate area of coastal mudflat wetland, to make ground slope from land to sea in the candidate area ≤5°, and restoring matrix in the candidate area;

S2. controlling water level of water in the candidate area at 5-15 cm, with the water surface area accounting for 40-60% of the candidate area;

S3. controlling vegetation coverage of the candidate area to be ≤30% and ≥10%, with vegetation height of ≤50 cm, planting and/or restoring salt tolerant vegetation areas;

S4. selecting and/or restoring ecological pinch points and/or ecological barrier points in the candidate area to construct ecological corridors; and S5. constructing wading bird habitats in the candidate area.

The restoration method can increase the number of wading birds in the coastal mudflat wetland by 33%-75%, and the restoration effect is remarkable.

10 Claims, 1 Drawing Sheet

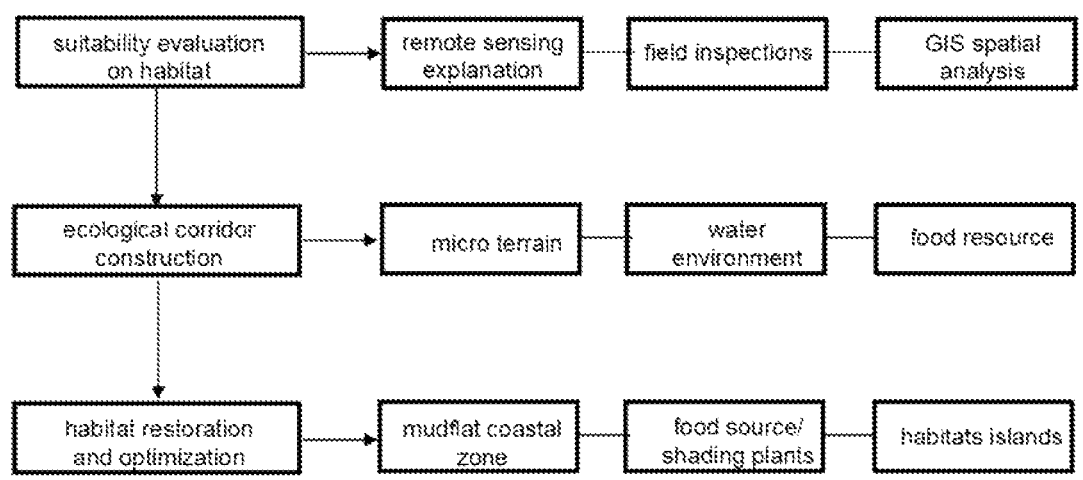

ECOLOGICAL RESTORATION METHOD FOR WADING BIRD HABITAT IN COASTAL MUDFLAT WETLAND

CROSS-REFERENCE TO RELATED APPLICATION

This application claims priority to and the benefit of Chinese patent Application No. 202311586342.1 filed Nov. 23, 2023. The entire contents of Chinese patent Application No. 202311586342.1 and the English translation of Chinese patent Application No. 202311586342.1 are incorporated herein by reference.

TECHNICAL FIELD

The invention relates to the technical field of ecological restoration methods, in particular to an ecological restoration method for wading bird habitat in coastal mudflat wetland.

BACKGROUND

Coastal mudflat wetland in China is located in the core area of the migration channel of migratory birds between East Asia-Australasia, providing important habitat for many rare and endangered birds. Due to intensification of global climate change and human disturbance, area of the coastal mudflat wetlands has shrunk and their ecological functions have declined, resulting in serious impacts on biodiversity, especially on wading birds who are extremely sensitive to structural changes and functional degradation of wetlands. Therefore, adhering to the concept of integrated ecology and using interdisciplinary as well as multi technology methods for ecological restoration and optimization of habitat have important practical significance for protecting and improving wading habitat in coastal mudflat wetland.

However, at present, the relevant reports on ecological restoration method of wading bird habitat in coastal mudflat wetland are still blank, and it is urgent to develop an ecological restoration method for wading bird habitat in coastal mudflat wetlands in this field.

SUMMARY

In order to solve the technical problem of filling above research gap in the prior art in the field, the present invention provides an ecological restoration method for wading bird habitat in coastal mudflat wetlands.

The technical solution of the present invention is as follows:

An ecological restoration method for wading bird habitat in coastal mudflat wetland, characterized in that, comprising the following steps:

S1. performing micro terrain renovation on a candidate area of coastal mudflat wetland, to make ground slope from land to sea in the candidate area ≤5°, and restoring matrix in the candidate area;

S2. controlling water level of water in the candidate area at 5-15 cm, with the water surface area accounting for 40-60% of the candidate area;

S3. controlling vegetation coverage of the candidate area to be ≤30% and ≥10%, with vegetation height of ≤50 cm, planting and/or restoring salt tolerant vegetation areas;

S4. selecting and/or restoring ecological pinch points and/or ecological barrier points in the candidate area to construct ecological corridors;

S5. constructing wading bird habitats in the candidate area; the wading bird habitat includes 2-3 bare flats with an area of ≥0.2 $km^2$, ecological ditches with a width of 1.5-2.5 m and a depth of 0.5-1.2 m, 3-4 deep water areas with an area of ≥0.5 $km^2$ and a depth of 1.8-3.5 m, and 5-6 shallow water areas with an area of ≥0.5 $km^2$ and a depth of 8-15 cm; connecting deep water areas and shallow water areas through ecological ditches.

Selecting the ecological barrier points of coastal mudflat wetland with a ground slope below 5°, a water level of more than 8 cm or less than 15 cm, and a vegetation coverage of less than 10% or more than 30% as the candidate area; preferably, controlling water level in the candidate area in cranes and storks habitat at 8-15 cm, and controlling water level in the candidate area in shorebirds habitat at 5-8 cm.

In S1, said restoring matrix includes: restoring the matrix by using dredging mud thin layer covering method; preferably, said restoring matrix also includes: selecting sediment with particle size range of 0.05~0.01 mm, and constructing silty muddy mudflat.

In S2, said controlling water level of water in the candidate area refers to, building a small gate on the location of an original tide ditch near land in the candidate area to control tide water entering and exiting the candidate area; Preferably, the height of the small gate is 2 m and the width is 1.5 m.

In S3, said restoring salt tolerant vegetation areas refers to: restoring by seedling transplantation+seed planting+bulb cultivation; preferably, the salt tolerant vegetation is *Scirpus mariqueter*; preferably, adopting a combination of physical, chemical, and biological methods to control reeds and *Spartina alterniflora* in the candidate area.

In S4, the ecological corridors are located in the area with altitude less than 10 m, slope less than 5°, vegetation coverage not less than 10% in the candidate area, and passes through the bare flats, reeds, grassland, and paddy fields in the candidate area.

In S5, the ecological ditches are with width of 1 m and depth of 2 m; there are 2 deep water areas with an area of 0.1 $km^2$ and a long-term depth of 40 cm.

In S1, the candidate area is area with low suitability in wading bird habitat of coastal mudflat wetland.

The ecological restoration method for wading bird habitat in coastal mudflat wetland, also comprising the following step: S6. taking food security measures for wading birds in the candidate area;

preferably, food security measures for wading birds include: using tidal ditches and gates to introduce natural food from seawater into the candidate area, and/or manually releasing benthic organisms in deep water areas of the candidate area, and/or manually releasing food consumed by wading birds in shallow water areas preferably, the benthic organisms include: gastropods, bivalves, crustaceans, polychaetes and insect larvae;

preferably, the food consumed by wading birds includes: sandworms, *Osteomugil ophuyseni*, mudskippers, and *Penaeus japonicus*

The beneficial effects of the present invention are as follows:

The present invention provides an ecological restoration method for wading bird habitat in coastal mudflat wetland. According to the biological attributes and ecological habits of representative wading birds in coastal mudflat, the current situation of the threatened habitats and wading bird population in coastal mudflat wetlands is found out, the suitability evaluation index system of representative wading bird habitat in coastal mudflat is constructed, ecological restoration measures of wading bird habitat in coastal mudflat wetlands are implemented, and ecological optimization technology of wading bird habitat is adopted, so as to improve quality of habitat and ensure safety of bird population. The habitat suitability evaluation index system includes: combining remote sensing image analysis, field inspections, and GIS spatial analysis technology, conducting habitat suitability level evaluation around four levels: food, water, shading conditions, and human interference; Using a mixed ecological corridor model to identify ecological nodes, ecological barrier areas, and ecological corridors. The ecological restoration measures include: using ecological engineering technology to transform mudflat base and restore the hydrological ecology of tidal ditch to build a habitat water environment suitable for wading birds; screening and planting halophytic wetland vegetation, releasing and colonizing large benthic animals to meet the feeding needs of wading birds. The ecological optimization technology includes: near natural optimization of mudflat banks; optimization of configuration of food source plants and shading plants; creating habitats islands for birds. The ecological restoration method for wading bird habitat in coastal mudflat wetland provided by the present invention can increase the number of wading birds by 33%-75%, and the restoration effect is remarkable.

DESCRIPTION OF DRAWINGS

FIG. 1 is flow diagram of the ecological restoration method for wading bird habitat in coastal mudflat wetland provided by an example of the present invention.

EMBODIMENTS

The specific content of the present invention will be further described in detail by combining specific embodiments and experimental examples, but this does not limit the protection scope of the present invention.

The invention provides an ecological restoration method for wading bird habitat in coastal mudflat wetland. All examples of the present invention have the following common features: the ecological restoration method for wading bird habitat in coastal mudflat wetland comprising the following steps:

S1. performing micro terrain renovation on a candidate area of coastal mudflat wetland, to make ground slope from land to sea in the candidate area ≤5°, and restoring matrix in the candidate area;

S2. controlling water level of water in the candidate area at 5-15 cm, with the water surface area accounting for 40-60% of the candidate area;

S3. controlling vegetation coverage of the candidate area to be ≤30% and ≥10%, with vegetation height of ≤50 cm, planting and/or restoring salt tolerant vegetation areas;

S4. selecting and/or restoring ecological pinch points and/or ecological barrier points in the candidate area to construct ecological corridors;

S5. constructing wading bird habitats in the candidate area; the wading bird habitat includes 2-3 bare flats with an area of ≥0.2 km², ecological ditches with a width of 1.5-2.5 m and a depth of 0.5-1.2 m, 3-4 deep water areas with an area of ≥0.5 km² and a depth of 1.8-3.5 m, and 5-6 shallow water areas with an area of ≥0.5 km² and a depth of 8-15 cm; connecting deep water areas and shallow water areas through ecological ditches.

In specific examples, selecting the ecological barrier points of coastal mudflat wetland with a ground slope below 5°, a water level of more than 8 cm or less than 15 cm, and a vegetation coverage of less than 10% or more than 30% as the candidate area;

preferably, controlling water level in the candidate area in cranes and storks habitat at 8-15 cm, and controlling water level in the candidate area in shorebirds habitat at 5-8 cm.

In some embodiments, in S4, selecting and/or restoring ecological pinch points and/or ecological barrier points in the candidate area to construct ecological corridors includes the following steps: monitoring bird migration channels at ecological pinch points, investigating population dynamics, reducing human interference, and/or performing micro terrain transformation, planting local tree species, and constructing ecological culverts at ecological barrier points to increase water system connectivity;

By taking above steps, an ecological corridor can be constructed in the area where ecological pinch points and ecological barrier points are located.

In more specific examples, above steps are common operations well-known to those skilled in the art, as detailed below:

Monitoring bird migration channels has a conventional technical meaning that is well-known to a person skilled in the art. For example, it can be monitored through the bird behavior tracker SAKER, or it can be same as monitoring recorded in the article "Research on Bird Diversity and Dynamic Changes in the Nanhaizi Wetland Nature Reserve of Inner Mongolia".

Investigating population dynamics has a conventional technical meaning which is well-known to a person skilled in the art, for example, it can be same as the "population quantity and distribution investigation" recorded in the article "Population dynamics changes of Oriental white stork (Ciconia boyciana) in Xingkai Lake".

Reducing human interference has a common technical meaning that is well-known to a person skilled in the art. For example, an area where bird migration channels are located can be avoided from tourism planning areas, or artificial isolation can be carried out to prevent people from entering the area where bird migration channels are located. It can also be same as "reduce human interference" recorded in the article "The impact of rice stubble winter farming mode on the species and quantity of migratory birds in the habitat of rare bird protection areas".

Micro terrain transformation has a conventional technical meaning that is well-known to a person skilled in the art, for example, it can be same as "Micro terrain transformation" recorded in the article "Water replenishment and restoration strategy based on micro terrain transformation in Koktuo Sea Wetland in Habahe County".

Planting local tree species has a conventional technical meaning that is well-known to a person skilled in the art. Local tree species generally refer to tree species that already exist in the area where ecological barrier points are located, rather than foreign tree species. For example, they can be same as "local tree species" in the article "Risk Study on Plant Investigation and Evaluation in Riverside and Lakeside Zone of Ninghai County". Planting has a common meaning in the field of common knowledge, for example, it can be the meaning of the word "planting" in the Baidu encyclopedia entry.

Constructing ecological culverts has a conventional technical meaning which is well-known to a person skilled in the art. Ecological culverts can be same as "ecological culverts" recorded in the article "Research on Ecological Land Renovation Planning and Design in Southwest Hilly and Mountainous Areas-Taking Land Remediation Project in Zhusha Village, Yihe Town, Fuling District, Chongqing as an Example"; constructing is the common meaning in the field of common knowledge, which can be the meaning of the word "constructing" recorded in the previous text, the meaning of the word "constructing" recorded in the article "Completion and Acceptance of Nanning's First Ecological Land Renovation Demonstration Project", or the meaning of the entry "constructing" on Baidu encyclopedia entry.

In further embodiments, in S1, restoring matrix includes: restoring the matrix using a dredging mud thin layer covering method;

The dredging mud thin layer covering method is a common technical term commonly understood by a person skilled in the art. It can be referred to as the "dredging mud thin layer covering method" recorded in the article "Current situation and potential application of dredging mud in coastal wetland ecological engineering in China".

Preferably, said restoring matrix also includes: selecting sediment with particle size range of 0.05 to 0.01 mm, and constructing silty muddy mudflat. The silty muddy mudflat has the function of fixing water, salt and other nutrients, providing a rich habitat for shellfish breeding.

Silty muddy mudflat are conventional technical terms commonly understood by those skilled in the art, and can be same as "silty mud" and "mudflat" recorded in the article "Evolution process of reclamation in Shandong Province and its impact on natural shoreline resources".

In some embodiments, in S2, said controlling water level of water in the candidate area refers to, building a small gate on the location of an original tide ditch near land in the candidate area to control tide water entering and exiting the candidate area;

Preferably, the height of the small gate is 2 m and the width is 1.5 m.

In other embodiments, in S3, said restoring salt tolerant vegetation areas refers to: restoring by seedling transplantation+seed planting+bulb cultivation;
preferably, the salt tolerant vegetation is *Scirpus mariqueter*;
preferably, adopting a combination of physical, chemical, and biological methods to control reeds and *Spartina alterniflora* in the candidate area;

The combination of physical, chemical, and biological methods is a conventional technical method commonly understood by a person skilled in the art, and can be same as a comprehensive method recorded in the article "Research Progress on the Prevention and Control of Invasive Species of *Spartina alterniflora*".

Using one of above ecological restoration method for wading bird habitat in coastal mudflat wetland, a spatially stratified mudflat wetland can be created, and form different levels of habitat spaces such as deep water area, shallow water area, mudflat, and bare flat, to meet the habitat selection needs of waterfowl with different morphological characteristics and foraging habits.

In some specific examples, in S4, the ecological corridors are located in the area with altitude less than 10 m, slope less than 5°, vegetation coverage not less than 10% in the candidate area, and passes through the bare flats, reeds, grassland, and paddy fields in the candidate area.

In some embodiments, in S5, the ecological ditches are with width of 1 m and depth of 2 m; there are 2 deep water areas with an area of 0.1 km$^2$ and a long-term depth of 40 cm.

In more specific examples, in S1, the candidate area of the coastal mudflat wetland is verified by remote sensing image data and field inspection. By combining the different biological attributes (leg length, beak length, body size), habitat selection factors such as ecological habits (feeding habits, behavioral rhythms, migration habits) and habitat selection characteristics (water level, food resources, degree of human interference, climate factors), a theory of Species Distribution Model is used to identify and determine the candidate area by using the Analytic Hierarchy Process.

The Analytic Hierarchy Process (AHP) is a conventional technical means well-known to a person skilled in the art, and has a common technical meaning that is well-known in this field. For example, it can be the meaning of the "Analytic Hierarchy Process" recorded in the article "Evaluation of Service Value of Artificial Wetland Ecosystem-Taking Nanhu National Urban Wetland Park as an Example".

The candidate area of the coastal mudflat wetland refers to an area with low habitat suitability, and the identification and determination of the candidate area is actually identifying an area with low habitat suitability.

Habitat suitability has a conventional technical meaning that is well-known to a person skilled in the art, for example, it can be same as the meaning of the term "habitat suitability" recorded in the article "Comparative Study of Habitat Suitability Changes of Migratory Waterbirds in Different Bays from 2010 to 2019".

Identifying an area with low habitat suitability is a conventional technical means which is well known to those skilled in the art. For example, the area with low habitat suitability can be identified by referring to steps recorded in the article "Comparative Study on the Adaptability Change of Migratory Waterbirds Habitat in Different Bays in 2010-2019", which can identify and determine the candidate area of the coastal mudflat wetlands described in the present invention.

In further examples, the ecological restoration method for wading bird habitat in coastal mudflat wetland also comprising: S6. taking food security measures for wading birds in the candidate area;
preferably, food security measures for wading birds include: using tidal ditches and gates to introduce natural food from seawater into the candidate area, and/or manually releasing benthic organisms in deep water areas of the candidate area, and/or manually releasing food consumed by wading birds in shallow water areas;
Preferably, the benthic organisms include: gastropods, bivalves, crustaceans, polychaetes and insect larvae
preferably, the food consumed by wading birds includes: sandworms, *Osteomugil ophuyseni*, mudskippers, and *Penaeus japonicus*.

Experiment Example 1: Restoration of Shorebirds Habitat

1. Selecting the Candidate Area
Analyzing and comparing remote sensing image data in 1985, 1995, 2005 and 2020, and analyzing land use change and transfer of coastal mudflat wetlands. In combination with data of shorebirds distribution points from field surveys, literature reports, China Bird Watching Record Center, ebird website and other sources, the historical changes and current status of wading birds (shorebirds) population and habitat under threat in coastal mudflat wetlands are clarified. Based on the remote sensing image data, by combining the biological attributes, ecological habits and habitat selection characteristics of representative wading birds (shorebirds) in the coastal mudflat, the species distribution model software is used to identify the coastal mudflat wetlands with large temporal and spatial changes in population dynamics and habitat distribution of shorebirds, as potential candidate areas of shorebirds, with an area of no less than 1000 mu.

2. Substrate Construction and Water Level Control (1) Renovating Micro Terrain

Utilizing mechanical equipment to rectify micro terrain, with a slope not exceeding 5°, to ensure that the slope from land to sea gradually decreases.

(2) Matrix Recovery

Based on elevation differences in the candidate area, the dredging mud thin layer covering method was used to restore substrate and reconstruct the intertidal habitat. By means of near natural recovery, silty muddy mudflat is constructed by selecting sediment with particle size ranging from 0.05 to 0.01 mm. The silty muddy mudflat has the function of fixing water, salt and other nutrients, providing a rich habitat for shellfish breeding.

3. Control of Water Level and Surface Elements:

(1) Cleaning up and dredging the original tidal ditch, and building a small 1.5 meter gate on the location of an original tide ditch near land to control the inflow and outflow of tide into and out of the candidate area, achieving the goal of controlling the water level in the candidate area. The water level in the candidate area should be controlled between 5-8 cm.

(2) The proportion of area of water surface to area of the candidate area is controlled between 40-60%.

4. Restoration of Vegetation (1) The vegetation coverage shall not exceed 30%, but also be not less than 10%.

(2) The vegetation height shall not exceed 50 cm. For reeds and *Spartina alterniflora*, a combination of physical, chemical, and biological methods shall be used for prevention and control. Cutting in July, submerging for more than 200 days with water, and ensure that the flooding level in the cutting area is not less than 50 cm. Discharging water for treatment, extinguishing residual plants, and drying the ground by sun for no less than 40 days.

(3) Screening and Planting of Salt Tolerant Vegetation

*Scirpus mariqueter* is a plant that wading birds like to eat. It uses a combination of seedling transplantation, seed planting, and bulb cultivation to restore vegetation area of *Scirpus mariqueter*.

(4) By using the gradient technology of imitation wooden stakes, creating a spatially stratified mudflat wetland, and cultivating coastal plant communities according to the hydrological conditions of mudflat at different levels.

Imitation wooden stakes are commonly used for slope protection in wetland restoration to prevent soil erosion. The gradient technology of imitation wooden stakes used in this experimental example refers to setting several imitation wooden stakes of different heights in a gradient arrangement, which facilitates water birds with different leg lengths to climb and rest.

Above "cultivating coastal plant communities according to the hydrological conditions of mudflat at different levels" refers to planting different coastal salt tolerant plants in different water level areas. Coastal salt tolerant plants are selected from: emergent plants, submerged plants, and semi humid plants. The relevant content can refer to the Chinese invention patent CN101161944B "Construction Technology of Aquatic Plant System in Coastal Saline alkali Landscape Water".

Creating a spatially stratified mudflat wetland means that above ecological restoration method for wading bird habitat in coastal mudflat wetlands can create spatially stratified mudflat wetlands, forming different levels of habitat spaces such as deep water areas, shallow water areas, mudflat, and bare flats, to meet habitat selection needs of water birds with different morphological characteristics and foraging habits.

5. Ecological Corridor Construction (1) Based on a hybrid model, commonly used ecological corridor identification models such as resistance model, habitat patch constraint model, minimum resistance model, and circuit theory model are combined to complement each other's advantages to scientifically and accurately identify potential bird ecological corridors. First, according to expert experience and the characteristics of habitat selection by birds, the weight of habitat environmental factors (mudflat, shrubs, ponds, rivers, farmland, construction land, etc.) and human interference factors (distance from roads, distance from residential areas) is calculated, and the ArcGIS grid calculator is used to model the resistance layer. Secondly, importing the patch and resistance layers into Linkage Mapper software and Circuitscape software to identify ecological pinch points and ecological barrier points. The area with high current density on the resistance surface is an ecological pinch point, indicating that the habitat in this area is in good condition, with low resistance values, suitable for the habitat and survival of birds, and is also an area where birds frequently move and diffuse. Ecological barrier points refer to areas with high current density and high resistance, which hinder the diffusion and movement of bird populations, and affect population communication and exchange. The restoration of ecological barrier points can effectively improve the ecological function of habitats and enhance the stability of habitat networks through measures such as micro terrain renovation, planting local tree species, and constructing ecological culverts to increase water system connectivity.

The ecological pinch point has the conventional technical meaning that is well-known to a person skilled in the art, and can be same as the "ecological 'pinch point'" recorded in the article "Identification of key areas for ecological restoration of national land space based on ecological security pattern-Taking Hezhou City as an example". Ecological pinch points are habitats that need to be maintained and protected, as their environment is already more suitable for bird survival.

The ecological barrier point has the conventional technical meaning that is well-known to a person skilled in the art, and can be same as the "ecological barrier point" recorded in the article "Identification of key areas for ecological restoration of national land space based on ecological security pattern-Taking Hezhou City as an example". Ecological barrier points are key candidate areas.

Selecting areas where ecological pinch points and ecological barrier points located to construct ecological corridors, and focusing on protecting and maintaining the identified ecological pinch points. Emphasizing natural solutions, such as monitoring bird migration channels, investigating population dynamics, and reducing human interference, to ensure the ecological safety of birds; for the identified ecological barrier points, artificial intervention measures are supplemented, such as micro terrain renovation, planting local tree species, and constructing ecological culverts to increase water system connectivity.

(2) For small wading birds such as plovers and sandpipers, the width of the ecological corridor is set to 100 m to meet the behavioral needs of bird movement and diffusion, while ensuring sufficient safety distance and reducing human interference.

(3) The ecological corridor mainly passes through landscape patches such as bare flats, reeds, grasslands, and paddy fields. Areas with low altitudes and gentle terrain is suitable for selected as ecological corridors, and areas with a slope of less than 5° are optimal. They also require a certain vegetation distribution to provide habitat and food resources for cranes.

6. Construction of Wading Bird Habitats (1) Creating 2-3 bare flats in the candidate area, with each bare flat not less than 0.2 km². The created bare flat will not be submerged during high tide and should remain exposed during high tide.

(2) Constructing ecological ditches with a width of 1 m and a depth of 2 m in the candidate area, and maintaining a water depth of no less than 2 m for a long time, can hinder the spread of reeds and *Spartina alterniflora*.

(3) Constructing two deep water zones with an area of 0.1 km² in the candidate area, maintaining a water depth of 20 cm for a long time. At the same time, deep water zones are connected with the shallow water zone through tidal ditches or channels to ensure that the water depth in the shallow water zone is between 5-8 cm.

7. Food Security Measures (1) Utilizing tidal ditches and gate systems to introduce food resources from seawater and provide natural food for wading birds in the candidate area.

(2) By artificially releasing benthic organisms (gastropods, bivalves, crustaceans, polychaetes, and insect larvae) in the deep water area of the candidate area, and releasing food such as sandworms for wading birds to feed in the shallow water area, so as to meet the food needs of wading birds.

8. The Implementation Effect of this Experimental Example

Based on the method of the invention, the wading bird habitat restoration of coastal mudflat wetland is implemented in Yancheng Wetland Rare Birds National Nature Reserve in Jiangsu Province. Compared with the population number of wetland flagship wading birds (shorebirds) before the ecological restoration of habitat, significant results have been achieved after the implementation of ecological restoration. The number of first class nationally protected bird species, *Eurynorhynchus pygmeus*, has increased from 150 before restoration to 200 after restoration; The number of first class nationally protected bird species *Larus saundersi*, has increased from 4000 before restoration to 7000.

Experiment Example 2: Restoration of Crane and Stork Habitat

1. Selecting the Candidate Area

Analyzing and comparing remote sensing image data in 1985, 1995, 2005 and 2020, and analyzing land use change and transfer of coastal mudflat wetlands. In combination with data of cranes and storks distribution points from field surveys, literature reports, China Bird Watching Record Center, ebird website and other sources, the historical changes and current status of wading birds (cranes and storks) population and habitat under threat in coastal mudflat wetlands are clarified. Based on the remote sensing image data, by combining the biological attributes, ecological habits and habitat selection characteristics of representative wading birds (cranes and storks) in the coastal mudflat, the species distribution model software is used to identify the coastal mudflat wetlands with large temporal and spatial changes in population dynamics and habitat distribution of cranes and storks, as potential candidate areas of cranes and storks, with an area of no less than 1000 mu.

2. Substrate Construction and Water Level Control (1) Renovating Micro Terrain

Utilizing mechanical equipment to rectify micro terrain, with a slope not exceeding 5°, to ensure that the slope from land to sea gradually decreases.

(2) Based on elevation differences in the candidate area, the dredging mud thin layer covering method was used to restore substrate and reconstruct the intertidal habitat. By means of near natural recovery, silty muddy mudflat is constructed by selecting sediment with particle size ranging from 0.05 to 0.01 mm. The silty muddy mudflat has the function of fixing water, salt and other nutrients, providing a rich habitat for shellfish breeding.

3. Control of Water Level and Surface Elements:

(1) Cleaning up and dredging the original tidal ditch, and building a small 1.5 meter gate on the location of an original tide ditch near land to control the inflow and outflow of tide into and out of the candidate area, achieving the goal of controlling the water level in the candidate area. The water level in the candidate area should be controlled between 5-8 cm.

(2) The proportion of area of water surface to area of the candidate area is controlled between 40-60%.

4. Restoration of Vegetation (1) The vegetation coverage shall not exceed 30%, but also be not less than 10%.

(2) The vegetation height shall not exceed 50 cm. For reeds and *Spartina alterniflora*, a combination of physical, chemical, and biological methods shall be used for prevention and control. Cutting in July, submerging for more than 200 days with water, and ensure that the flooding level in the cutting area is not less than 50 cm. Discharging water for treatment, extinguishing residual plants, and drying the ground by sun for no less than 40 days.

(3) Screening and planting of salt tolerant vegetation *Scirpus mariqueter* is a plant that wading birds like to eat. It uses a combination of seedling transplantation, seed planting, and bulb cultivation to restore vegetation area of *Scirpus mariqueter*.

(4) By using the gradient technology of imitation wooden stakes, creating a spatially stratified mudflat wetland, and cultivating coastal plant communities according to the hydrological conditions of mudflat at different levels.

Imitation wooden stakes are commonly used protective devices in this field and are well-known to a person skilled in the art. They can be referred to as "Imitation wooden stakes" in the article "Quantification and Evaluation of Carbon Footprint of Ecological Rivers in Plain Water Network Areas". Imitation wooden stakes are commonly used for slope protection in wetland restoration to prevent soil erosion. The gradient technology of imitation wooden stakes used in this experimental example refers to setting several imitation wooden stakes of different heights in a gradient arrangement, which facilitates water birds with different leg lengths to climb and rest.

Above "cultivating coastal plant communities according to the hydrological conditions of mudflat at different levels" refers to planting different coastal salt tolerant plants in different water level areas. Coastal salt tolerant plants are selected from: emergent plants, submerged plants, and semi humid plants. The relevant content can refer to the Chinese invention patent CN101161944B "Construction Technology of Aquatic Plant System in Coastal Saline alkali Landscape Water".

Creating a spatially stratified mudflat wetland means that above ecological restoration method for wading bird habitat in coastal mudflat wetlands can create spatially stratified mudflat wetlands, forming different levels of habitat spaces such as deep water areas, shallow water areas, mudflat, and bare flats, to meet habitat selection needs of water birds with different morphological characteristics and foraging habits.

5. Ecological Corridor Construction (1) Based on a hybrid model, commonly used ecological corridor identification models such as resistance model, habitat patch constraint model, minimum resistance model, and circuit theory model are combined to complement each other's advantages to scientifically and accurately identify potential bird ecological corridors. First, according to expert experience and the characteristics of habitat selection by birds, the weight of habitat environmental factors (mudflat, shrubs, ponds, rivers, farmland, construction land, etc.) and human interference factors (distance from roads, distance from residential areas) is calculated, and the ArcGIS grid calculator is used to model the resistance layer. Secondly, importing the patch and resistance layers into Linkage Mapper software and Circuitscape software to identify ecological pinch points and ecological barrier points. The area with high current density on the resistance surface is an ecological pinch point, indicating good habitat conditions and low resistance values, suitable for bird habitat and survival. Ecological barrier points refer to areas with high current density and high resistance. Restoring ecological barrier points can effectively improve the ecological function of habitats and enhance the stability of habitat networks.

(2) For large wading birds such as cranes and storks, the width of the ecological corridor is set at 200 m to meet the behavioral needs of bird movement and dispersal, while ensuring sufficient safety distance and reducing human interference.

(3) The ecological corridor mainly passes through landscape patches such as bare flats, reeds, grasslands, and paddy fields. Areas with low altitudes and gentle terrain is suitable for selected as ecological corridors, and areas with a slope of less than 5° are optimal. They also require a certain vegetation distribution to provide habitat and food resources for cranes and storks.

6. Construction of Wading Bird Habitats (1) Creating 2-3 bare flats in the candidate area, with each bare flat not less than 0.2 km². The created bare flat will not be submerged during high tide and should remain exposed during high tide.

(2) Constructing ecological ditches with a width of 1 m and a depth of 2 m in the candidate area, and maintaining a water depth of no less than 2 m for a long time, can hinder the spread of reeds and *Spartina alterniflora*.

(3) Constructing two deep water zones with an area of 0.1 km² in the candidate area, maintaining a water depth of 40 cm for a long time. At the same time, deep water zones are connected with the shallow water zone through tidal ditches or channels to ensure that the water depth in the shallow water zone is between 8-15 cm.

7. Food Security Measures (1) Utilizing tidal ditches and gate systems to introduce food resources from seawater and provide natural food for wading birds in the candidate area.

(2) By artificially releasing benthic organisms in the deep water area of the candidate area, providing food such as fish and shrimp in the deep water area, and releasing food such as sandworms for wading birds to feed in the shallow water area, so as to meet the food needs of cranes and storks.

8. The Implementation Effect of this Experimental Example

Based on the method of the invention, the wading bird habitat restoration of coastal mudflat wetland is implemented in Yancheng Wetland Rare Birds National Nature Reserve in Jiangsu Province. Compared with the population number of wetland flagship wading birds (cranes and storks) before the ecological restoration of the habitat, significant results have been achieved after the implementation of ecological restoration. The number of first class nationally protected bird species Grus japonensis, has increased from 400 before restoration to 600 after restoration. Through the monitoring records, it is found that the Grus japonensis have naturally propagated under the wild conditions of the Reserve for five consecutive years, and the breeding ground is located in the deep of the mudflat wetland after the ecological restoration, which indicates that the ecological restoration measures have achieved certain results.

The invention claimed is:

1. An ecological restoration method for wading bird habitat in coastal mudflat wetland, characterized in that, comprising the following steps:
   S1. performing micro terrain renovation on a candidate area of coastal mudflat wetland, to make ground slope from land to sea in the candidate area ≤5°, and restoring matrix in the candidate area;
   S2. controlling water level of water of regions except for wading bird habitats in the candidate area at 5-15 cm, with the water surface area of the regions except for wading bird habitats accounting for 40-60% of the candidate area;
   S3. controlling vegetation coverage of the candidate area to be ≤30% and ≥10%, with vegetation height of ≤50 cm, planting or restoring salt tolerant vegetation areas;
   S4. selecting or restoring ecological pinch points or ecological barrier points in the candidate area to construct ecological corridors;
   S5. constructing wading bird habitats in the candidate area; the wading bird habitat includes 2-3 bare flats with an area of ≥0.2 km², ecological ditches with a width of 1.5-2.5 m and a depth of 0.5-1.2 m, 3-4 deep water areas with an area of ≥0.5 km² and a depth of 1.8-3.5 m, and 5-6 shallow water areas with an area of ≥0.5 km² and a depth of 8-15 cm; connecting deep water areas and shallow water areas through ecological ditches.

2. The ecological restoration method for wading bird habitat in coastal mudflat wetland according to claim 1, characterized in that, selecting coastal mudflat wetland with a ground slope below 5°, a water level of more than 8 cm or less than 15 cm, and a vegetation coverage of less than 10% or more than 30% as the candidate area;
   and/or, controlling water level in the candidate area in cranes and storks habitat at 8-15 cm, and controlling water level in the candidate area in shorebirds habitat at 5-8 cm.

3. The ecological restoration method for wading bird habitat in coastal mudflat wetland according to claim 1, characterized in that, in S1, said restoring matrix includes: restoring the matrix by using dredging mud thin layer covering method; and/or, said restoring matrix also includes: selecting sediment with particle size range of 0.05~0.01 mm, and constructing silty muddy mudflat.

4. The ecological restoration method of wading bird habitat in coastal mudflat wetland according to claim 1, characterized in that, in S2, said controlling water level of water in the candidate area refers to, building a gate on the location of an original tide ditch near land in candidate area to control tide water entering and exiting the candidate area.

5. The ecological restoration method of wading bird habitat in coastal mudflat wetland according to claim 4, characterized in that the height of the gate is 2 m and the width is 1.5 m.

6. The ecological restoration method for wading bird habitat in coastal mudflat wetland according to claim 1, characterized in that, in S3, said restoring salt tolerant vegetation areas refers to: restoring by seedling transplantation+seed planting+bulb cultivation;
and/or, the salt tolerant vegetation is *Scirpus mariqueter*;
and/or, adopting a combination of physical, chemical, and biological methods to control reeds and *Spartina alterniflora* in the candidate area.

7. The ecological restoration method of wading bird habitat in coastal mudflat wetland according to claim 1, characterized in that, in S4, the ecological corridors are located in the area with altitude less than 10 m, slope less than 5°, vegetation coverage not less than 10% in the candidate area, and passes through the bare flats, reeds, grassland, and paddy fields in the candidate area.

8. The ecological restoration method for wading bird habitat in coastal mudflat wetland according to claim 1, characterized in that, also comprising the following step: S6, taking food security measures for wading birds in the candidate area.

9. The ecological restoration method for wading bird habitat in coastal mudflat wetland according to claim 8, characterized in that food security measures for wading birds include: using tidal ditches and gates to introduce natural food from seawater into the candidate area, and/or manually releasing benthic organisms in deep water areas of the candidate area, and/or manually releasing food consumed by wading birds in shallow water areas.

10. The ecological restoration method for wading bird habitat in coastal mudflat wetland according to claim 9, characterized in that, the benthic organisms include: gastropods, bivalves, crustaceans, polychaetes and insect larvae;
and/or, the food consumed by wading birds includes: sandworms, *Osteomugil ophuyseni*, mudskippers, and *Penaeus japonicus*.

* * * * *